United States Patent [19]
Bishop

[11] 3,785,063
[45] Jan. 15, 1974

[54] PROCESS AND APPARATUS FOR DEHYDRATING MOISTURE CONTAINING MATERIAL

[76] Inventor: Ralph W. Bishop, 1620 S. Ocean Dr., Fort Lauderdale, Fla. 33316

[22] Filed: Oct. 6, 1971

[21] Appl. No.: 187,087

[52] U.S. Cl. .................. 34/128, 34/129, 34/136
[51] Int. Cl. .................................. F26b 11/02
[58] Field of Search .............. 34/22, 33, 68, 128, 34/129, 136, 31, 216; 432/106

[56] References Cited
UNITED STATES PATENTS

| | | | |
|---|---|---|---|
| 126,455 | 5/1872 | Guardiola | 34/129 |
| 3,585,730 | 6/1971 | Morse | 34/68 |
| 534,491 | 2/1895 | Atwood | 34/136 X |
| 2,323,289 | 7/1943 | Anderson et al. | 34/129 |
| 2,822,153 | 2/1958 | Arnold | 34/128 |

Primary Examiner—Carroll B. Dority, Jr.
Attorney—Harvey B. Jacobson

[57] ABSTRACT

Apparatus for performing a process of dehydrating moisture-containing material for processing into animal feed has the steps of predrying a comminuted moisture-containing material by subjecting the material to a heated gaseous current, and drying the predried material by subjecting same to a heated gaseous current. Apparatus for carrying out this process has a conditioner for subjecting a comminuted moisture-containing material to a heated gaseous current to predry the material, and a main dryer in communication with the conditioner for further subjecting the material to a heated gaseous current to dry the material to a predetermined level. The conditioner may be a single pass dryer, and the main dryer a multipass dryer.

6 Claims, 4 Drawing Figures

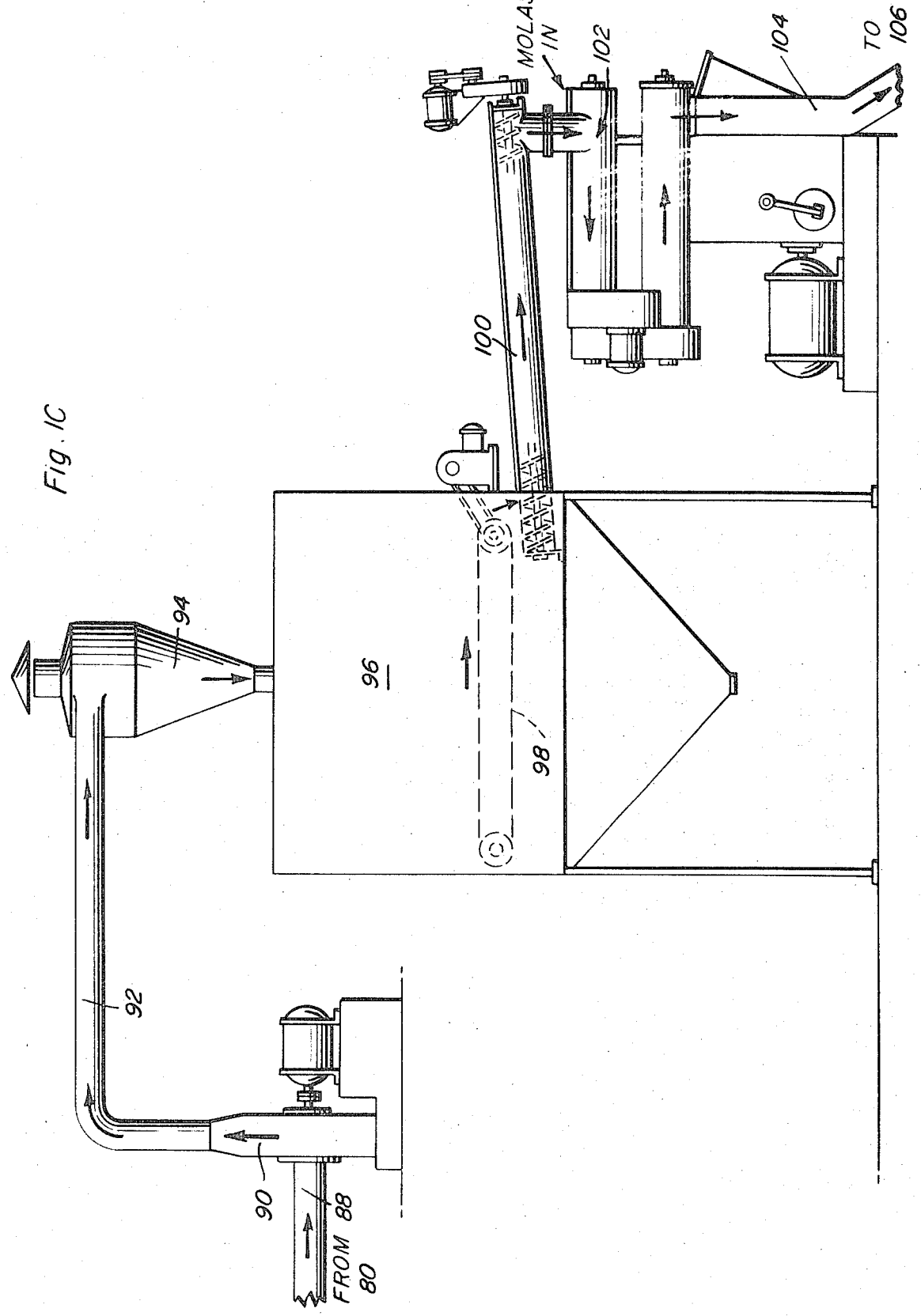

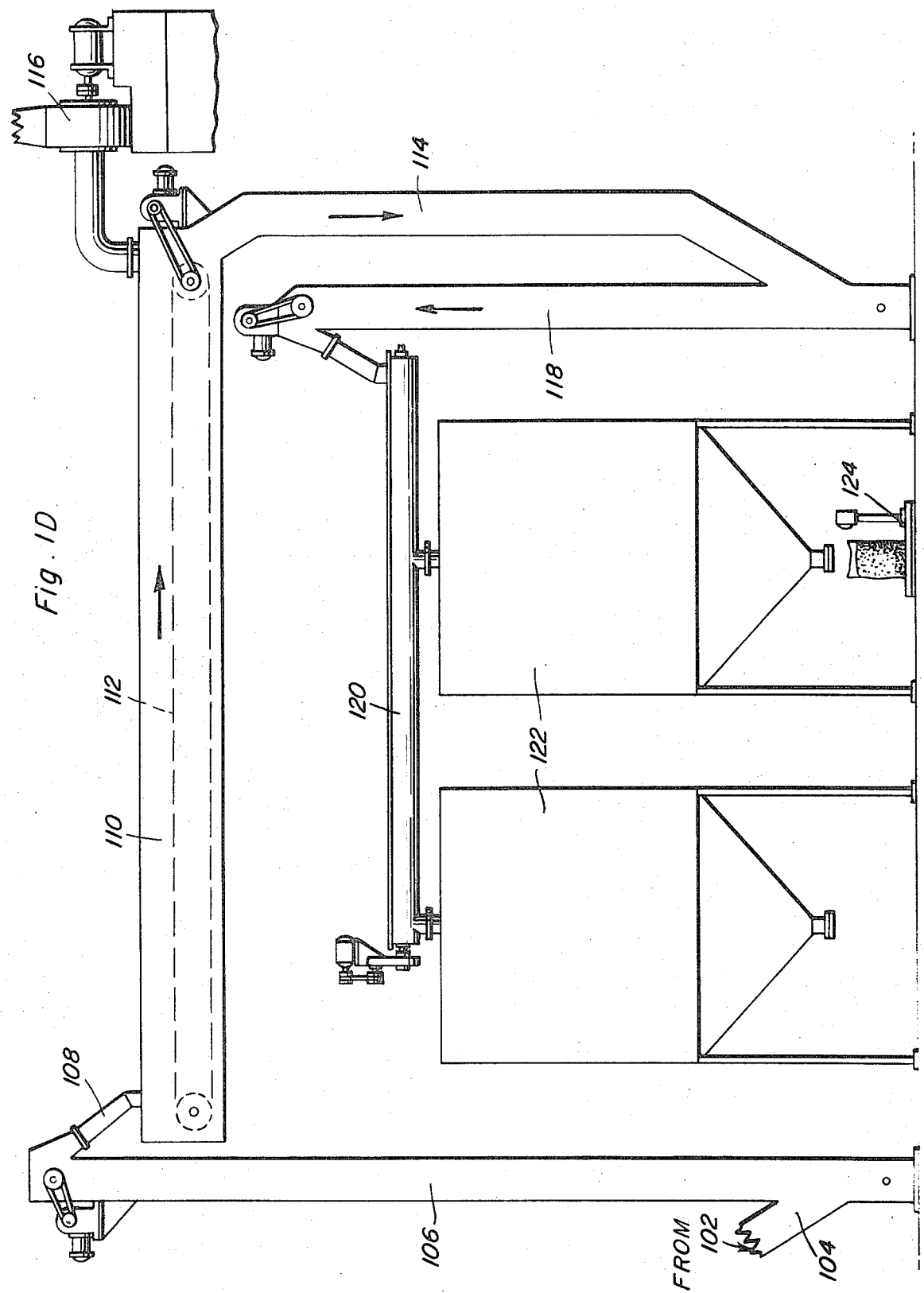

3,785,063

PROCESS AND APPARATUS FOR DEHYDRATING MOISTURE CONTAINING MATERIAL

BACKGROUND OF THE INVENTION

This invention relates to a apparatus for dehydrating moisture-containing material. The dehydration is achieved by subjecting the material to heated gaseous currents in predrying and drying steps.

There has been a trend in recent years to produce animal feed having a nutritionally significant proportion of sugar from organic materials such as sugar cane, citrus, sorghums, corn, and sugar beets. Animal feeds processed from such materials are of particular value in those geographical areas which do not produce great quantities of grain. An example of a process of making such animal feeds using sugar cane and molasses may be found in, for example, U. S. Pat. No. 3,586,511, issued June 22, 1971, to Ralph W. Bishop. It is inherent to this and other known processes that the material being processed must be dehydrated before it can be processed to final form. The known processes and apparatus for carrying out this dehydration have left much to be desired as regards both cost of operation and quality of the product.

SUMMARY OF THE INVENTION

It is an object of the present invention to provide an apparatus for dehydrating moisture-containing materials. In particular, for dehydrating organic moisture-containing materials for processing into animal food.

This and other objects are achieved according to the present invention by providing apparatus for a dehydration process having the steps of predrying a comminuted moisture-containing material by subjecting the material to a heated gaseous current and drying the predried material by subjecting same to a heated gaseous current. Preferably, the process includes the step of superheating the gaseous current used in the drying step. This is advantageously realized by superheating the heated gaseous current from the predrying step in a main furnace for use as the gaseous current in the drying step thereby enabling a saving in fuel consumed to heat the gaseous current in the main furnace.

The predrying step is preferably carried out by moving the material through a single pass dryer. The step of drying the material preferably is carried out by moving the material through a multipass dryer.

If a single pass dryer is used to carry out the predrying step, it is advantageous to include a step of deflecting the material to different locations in the dryer for maintaining the temperature in the dryer at a value above the condensation point of the moisture.

After the material has been dried by the drying step, a step of separating the dried material from the gaseous current may be employed.

A preferred embodiment of the apparatus for carrying out the present invention has conditioner means for subjecting a comminuted moisture-containing material to a heated gaseous current to predry the material, and main dryer means in communication with the conditioner means for further subjecting the material to a heated gaseous current to dry the material to a predetermined level. Specifically, a preferred embodiment of the present invention contemplates using a single pass dryer as the conditioner means, and a multipass, especially a three-pass, dryer as the drying means.

An adjustable deflector means may be arranged in the single pass dryer for deflecting the material to different locations in the dryer for mainaining the temperature in the dryer at a value above the condensation point of the moisture.

The conditioner means of a preferred embodiment has a conditioner furnace in communication with the conditioner for supplying a heated gaseous current thereto. The main dryer means may have a main furnace in communication with the multipass dryer for supplying a superheated gaseous current thereto.

Further, the main furnace may also be in communication with the conditioner for superheating a gaseous current passed therefrom.

The main dryer means may have a cyclone separator in communication with the multipass dryer for separating the gaseous current from the dried material.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1A to 1D are sequential schematic elevational views of a process flow diagram of a dehydrating and pelletizing plant using the apparatus for dehydrating moisture-containing material according to the present invention.

DESCRIPTION OF THE PREFERRED EMBODIMENT

Figure 1A:
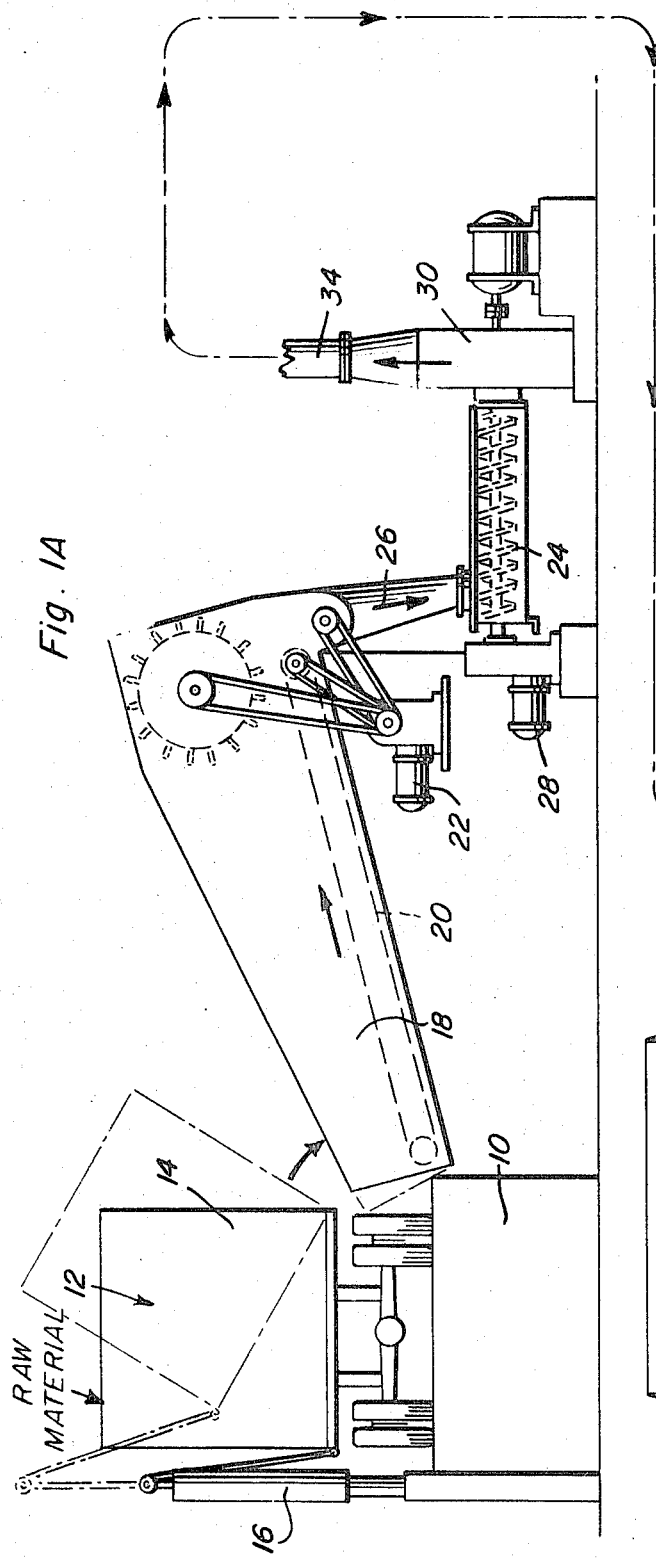
Figure 1A:
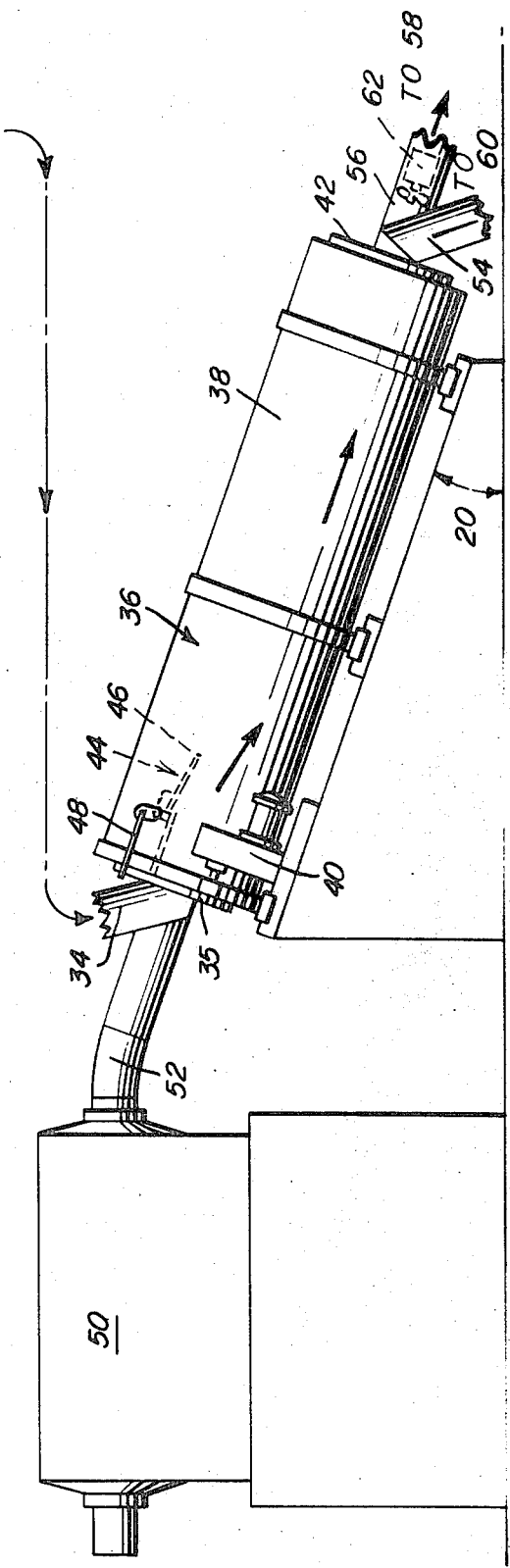

Since the dehydrating apparatus according to the present invention is particularly for use in a plant producing animal feed pellets, a process flow diagram for an entire pelletizing plant has been shown in the drawings and will be referred to below.

Figure 1B:
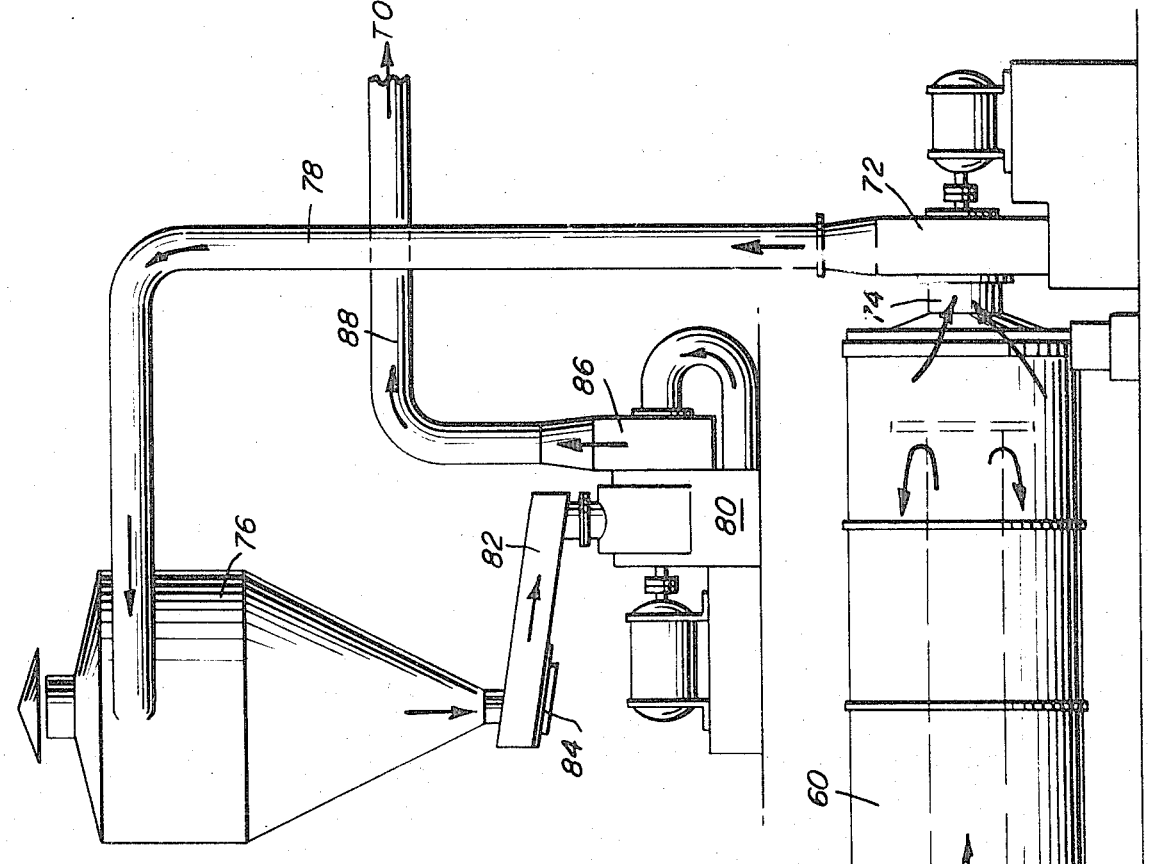
Figure 1B:
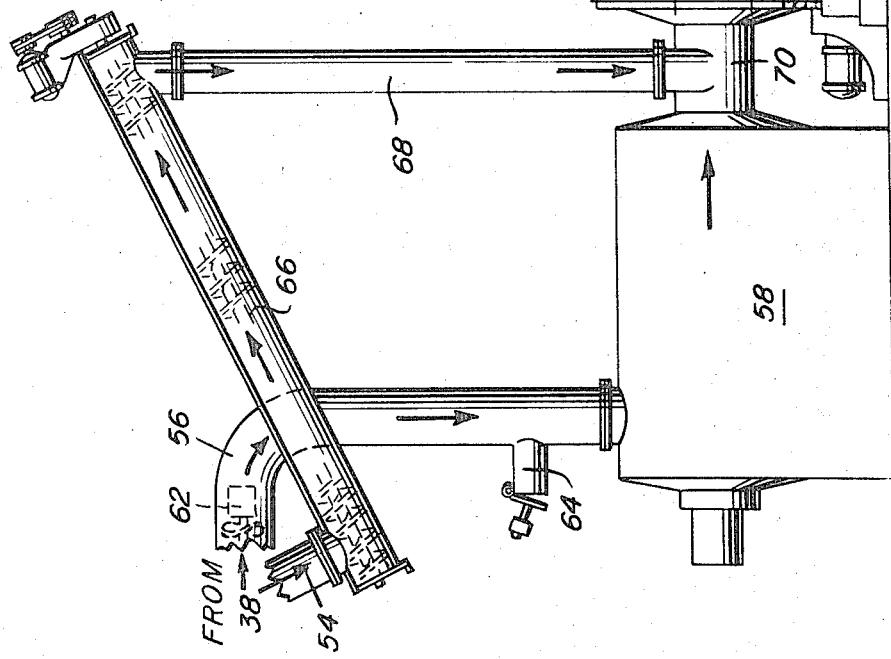

The flow of raw material starts in FIG. 1A and proceeds through FIGS. 1B and 1C to FIG. 1D.

Referring first to FIG. 1A of the drawings, an elevated platform 10 is provided on which is positioned a vehicle 12 having a, for example, side-dumping body 14. Vehicle 12 may reach platform 10 in any known manner, such as by means of a ramp (not shown). A suitable, known jack 16 is arranged adjacent platform 10 to dump the contents of body 14 into a green feeder 18. Feeder 18 has a conveyor belt 20 driven by a motor 22 to move the raw material into a chopper 24 via a chute 26. Chopper 24 is driven by a motor 28. A blower 30 is connected to the outlet of chopper 24 so as to receive comminuted material therefrom. Blower 30 is connected to the inlet end 35 of a conditioner, such as, for example, single pass dryer 36, via a pipeline 34. Dryer 36 has a cylindrical shell 38 rotatably mounted in a known manner for rotation by a drive unit 40 through a friction drive. It has been found advantageous to incline shell 38 at an angle of, for example, 20 degrees from outlet end 42 towards inlet end 35.

An adjustable deflector 44 is mounted inside shell 38 adjacent inlet end 35. Deflector 44 has a pivotally mounted deflecting plate 46 which can be adjusted in a known manner by, for example, a rod 48. Suitable, known means, such as a clamp (not shown) can be used to lock plate 46 in a desired position by clamping directly to rod 48.

A conditioner furnace 50 is in communication with shell 38 via a pipeline 52 connected to inlet end 35.

Inlet and outlet openings (not shown) are provided at inlet and outlet ends 35 and 42, respectively, to permit the passage of the raw material being processed and a gaseous current.

Pipelines 54 and 56 are connected to outlet end 42 of shell 38. Pipeline 54 is provided to convey the raw material being processed, and pipeline 56 is provided to convey the gaseous current leaving shell 38.

FIG. 1B of the drawings shows a main furnace 58, and a main dryer 60. Shell 38 is in communication with furnace 58 via pipeline 56. A fan 62 to influence the gas, and a damper 64 to balance the gas are mounted in pipeline 56. Dryer 60 is in communication with shell 38 by means of pipeline 54, a screw conveyor 66, a chute 68, and a T-fitting 70. Fitting 70 also puts furnace 58 in communication with dryer 60.

Main dryer 60 may be a single pass dryer, but a multipass dryer is preferred — a three-pass dryer being shown in FIG. 1B.

The inlet of a blower 72 is connected to the outlet 74 of dryer 60 and the outlet of blower 72 is connected to a cyclone separator 76 via a pipeline 78. The outlet of fiber and air separating separator 76 is connected to a meal produced hammer mill or grinder 80 via a vibrating conveyor trough 82 driven by a suitable, known vibratory motor 84.

The outlet of the hammer mill or grinder 80 is connected to a meal cyclone separator 94 via pipelines 88 and 92 and booster blower 90 (FIG. 1C). The meal is discharged from the separator 94 into a meal bin 96. A pelletizing machine 102 is connected with meal bin 96 via a screw conveyor 100. Conveyor belt 98 in bin 96 feeds the meal to conveyor 100. Alternatively, the meal in bin 96 could be transported to a meal storage bin (not shown).

A chute 104 and an elevator 106 (FIG. 10) transport pellets from the pelletizing machine 102 to a caller 110 where the pellets are cooled by air. A conveyor belt 112 moves the pellets from chute 108 across caller 110 to chute 114. A blower 116 is provided to draw air through caller 110. The pellets are taken from chute 114 and elevated in elevator 118 to a distribution system such as screw conveyor 120. Conveyor 120 distributes the pellets to pellet storage bins 122. The pellets may now be stored or bagged by weight as by a scale 124.

OPERATION

Raw material, such as sugar cane, is dumped into green feeder 18 from the vehicle 12. It is then passed through chopper 24 where it is comminuted into small pieces of, for example, 1/4 inch in length. Blower 30 then feeds the comminuted raw material via pipeline 34 to conditioner, or dryer 36.

Conditioner, or dryer 36 is also used as a means for conveying the raw material, and the flow may be controlled as desired by stopping and starting the flow through shell 38. The inclination of shell 38 facilitates the flow of the material by having the force of gravity supplement that of the gaseous current. If desired, the conditioner may be used solely as a conveying means, without performing any predrying.

Conditioner furnace 50 is set at a temperature of, for example, 2,000° F., and is maintained at that temperature in a known manner. Deflector 44 in dryer 36 deflects the comminuted raw material to different locations in the dryer for maintaining the temperature in dryer 36 at a value above the condensation point of the moisture. In practice, it has been found that the temperature in dryer 36 should remain above 150° F. A predetermined amount of moisture is removed from the material in dryer 36. The heated air removed from dryer 36 via pipeline 56 and fan 62 is fed to furnace 58 where it is superheated to a temperature such that the temperature in dryer 60 will not go below a value of, for example, 250° F. so that the moisture in dryer 60 will remain in an evaporated or gaseous state. That is, the temperature of the gaseous current leaving blower 72 should be sufficient to assure the absence of condensation which would rehydrate the dried material. The main furnace 58 is also automatically controlled to maintain constant heat therein up to, for example, 2,500° F. in order to supply enough heat to keep the temperature in dryer 60 at the desired level. This desired level is a function of the desired final moisture content of the material being processed. If the air in dryer 36 contains, for example, 24 parts of water per cubic foot of air, the superheated air in dryer 60 will have 48 parts of water per cubic foot of air.

Since the material has been predried in the single pass dryer 36, it has been heated to a point where its moisture is being evaporated. This means that moisture in the material being processed begins evaporating as soon as the material enters the main dryer 60. Thus, the capacity of dryer 60 is effectively increased by not having to heat the material and the air to the necessary temperatures. The outside moisture on the material protects it from the high heat encountered in dryer 60 from the superheated gaseous current, which is preferably air.

The process permits main furnace 58 to be maintained at a much higher temperature than would otherwise be permitted without damage to the material being processed, with a resulting ability to remove 36 percent more moisture, or water, from the material being processed with a given main dryer 60.

When employing the preferred feature of using the air from dryer 36 for the gaseous current in main dryer 60, the process and apparatus according to the present invention can produce better than one-third more than its designed capacity at a given temperature. In addition, a savings in fuel of approximately 18 percent is realized due to the use of the gaseous current from the conditioner. The air from dryer 36 may constitute as much as 50 percent of the air used in main dryer 60, any excess air being dumped by an end balance at damper 64.

In the event that it is desired to pass more air through main dryer 60 while keeping the speed of the material to be processed constant, it is to be understood that all of the gaseous current leaving dryer 36 could be dumped into the atmosphere and a fuel savings up to 6 percent of the Btu's needed in main dryer 60 to remove a pound of moisture, or water, at given conditions could still be realized. Regardless, the material being processed should lose 40 to 60 percent by weight of the moisture to be evaporated in the predrying step in order to achieve a given end product at blower 72.

Although the parameters set out above will result in optimum savings as regards fuel cost, they do not necessarily give optimum quantity of the final product. Further, they may not ensure maximum capacity for main dryer 60. Thus, fuel savings can be sacrificed by increasing the amount of moisture removed in the pre-drying step and dumping all of the gaseous current exhausted by dryer 36 into the atmosphere, while increasing the capacity of main dryer 60.

Examples of test results verifying the savings realized with the process and apparatus of the present invention are set out below. It is noted that the moisture content measurements were made with a "Sinco" moisture balancer or dry and wet bulb thermometer in air.

TEST NUMBER 1.

Normal Operation of the Plant, Both Conditioner and Main Dryer or Three Pass in this Case, Operating.
First Conditioner Function
Material Goes in at 57 Percent Moisture in the Material
- Fuel Gallon Per Minute — 0.04 or 24 gal. per hr.
- Exhaust Temperature — 175°
- Furnace Temperature — 2,000°
- Material Moisture Out of Conditioner — 47 per cent

SECOND

Three Pass Dryer or Main Dryer Function Material Passes Over from the Conditioner and in at 47%
- Fuel Gallon Per Minute — 1.0 or 60 gal. per hr.
- Second Pass Temperature — 350°
- Furnace Temperature — 2,000°
- Exhaust Temperature — 275°
- Moisture Out of the Main Dryer — 10 per cent
- Note: No Damage Beyond Normal Drying FIRST
Tons of Material Produced at Main Dryer — 3.25
24 Gallons of Fuel Used 1 Gallon Fuel — 138,000 B.T.U. or 3,312.000 B.T.U.
B.T.U. to Remove 1 lbs. of Water — 1,280 B.T.U. (2.590 × 1.280 B.T.U. = 3.315.200)
57 to 47 per cent Moisture — 797 lbs. of Water Per Ton
Water Evaporated in 1 hour — 2,590 lbs. (797 × 3.25 Tons)
SECOND
Tons of Material Produced at Main Dryer—3.25
60 Gallons of Fuel Used 1 Gallon Fuel — 138,000 B.T.U. or 8,280.000 B.T.U.
B.T.U. Used to Remove 1 lbs. of Water — 1,820 B.T.U. 4,546.75 × 1.820 B.T.U. = 8.275.085
Water Evaporated in 1 Hour — 4,546.75 lbs. 1.399 lbs. of Water × 3.25 Tons per Hour

TEST NUMBER TWO.

All Air From Conditioner Dumped Into Atmosphere and Heated Material Only Then Taken to Three Pass or Main Dryer.
FIRST
Condition Operation —57 in 47 per cent Moisture Out Air Dumped
Furnace Temperature—2,000°
Exhaust Temperature — 175°
Fuel Per Minute — 0.4 = 24 Gallons Per Hour
SECOND
Main Dryer or Three Pass Function in at 47 per cent Moisture
Fuel —Gallon Per Minute — 1.2 or 72 Gallons per Hour.
Second Pass Temperature 350°
Exhaust Temperature 280°
Furnace Temperature 2,100°
Material out at 10 per cent Moisture
Note: No Damage Beyond Normal Drying.
FIRST
Tons of Material Produced Per Hour at Main Dryer were 3.25
24 Gallons of Fuel Used 1 Gallon of Fuel = 138.000 B.T.U. or 3.312.000 B.T.U.
57 Per Cent to 47 Per Cent Moisture = 797 Pounds of Water (2.196 − 1.399)
Water Evaporated in One Hour = 2.590 Lbs. (797 × 3.25 Tons)
BTU Needed To Remove 1 Lbs. of Water = 1.280 B.T.U. (2.590 × 1.280= 3,315.00 B.T.U.)
SECOND
Three Pass Dryer or Main Dryer Function Material Passes Over From Conditioner Just Heated and Giving Up Moisture in at 47 Per Cent
72 Gallons of Fuel Per Hour × 138,000 BTU = 9.936.000 B.T.U. Used
4,546.75 × 2.185 Pounds of Water Evaporated = 9,934.648 B.T.U. or 2.185 B.T.U. Per Pound of Water

TEST NUMBER THREE

All Air From Condtioner Off and Green Material Going Through Conditioner Cool and Conditioner Used Just as Handling Devise or Conveying Material to Main or Three Pass Dryer From Green Feeder. This is to Show Main or Three Pass Dryer Alone.
FIRST CONDITIONING FUNCTION:
Fuel Used: None
Exhaust Temperature: None
Furnace Temperature: None
Moisture in at 57 per cent and Out at 57 per cent
SECOND THREE PASS OR MAIN DRYER FUNCTION WITH COOL MATERIAL 57 PER CENT MOISTURE OUT, 10 PER CENT MOISTURE.
Fuel Used Per Minute: 1.7 or 102 Gallons Per Hour
Second Pass Temperature: 400°
Exhaust Temperature: 290°
Furnace Temperature: 2,300°
Note: Material Show Damage and Browning at This Temperature From Lack of Moisture, Which Have Protected it, in Our Process, in the High Heat Period.
FIRST CONDITIONER FUNCTION, NO HEAT HANDLING, ONLY CONVEYING MATERIAL
SECOND THREE PASS FUNCTION PERFORMANCE
3.25 Tons of Material Was Produced at Main Dryer at 10 per cent
102 Gallons of Fuel Used or 138,000 × 102 = 14,076,000
2,196 Pounds of Water Per Ton Produced × 3.25 Tons = 7,137 Lbs. of Water
7,137 Pounds of Water = 14,076.000 B.T.U.
7,137 Pounds of Water × 1.972 B.T.U. = 14,074.416 B.T.U. or 1.972 B.T.U Per Pound of Water Evaporated The foregoing is considered as illustrative only of the principles of the invention. Further, since numeral modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for dehydrating moisture containing material, comprising, in combination:
   a. conditioner means for subjecting a moisture-containing material to a heated gaseous current to predry the material, said conditioner means having a single pass dryer;
   b. main dryer means in communication with said conditioner means for further subjecting the material to a heated gaseous current to dry the material to a predetermined level, said main dryer means having a multipass dryer in communication with said single pass dryer;
   c. said conditioner means having adjustable deflector means arranged in said single pass dryer for deflecting the material to different locations in said single pass dryer for maintaining a predetermined temperature therein; and
   d. said conditioner means further having a conditioner furnace in communication with said single pass dryer for supplying a heated gaseous current thereto, and said main dryer means having a main furnace in communication with said multipass dryer for supplying a superheated gaseous current thereto, said main furnace being also in communication with said single pass dryer for superheating a gaseous current passed therefrom.

2. Apparatus as defined in claim 1, wherein said main dryer means has a cyclone separator in communication with said multipass dryer for separating the gaseous current from the dried material.

3. Apparatus for dehydrating moisture containing material, comprising, in combination:
   a. conditioner means for subjecting a moisture-containing material to a heated gaseous current to predry the material;
   b. main dryer means in communication with said conditioner means for further subjecting the material to a heated gaseous current to dry the material to a predetermined level;
   c. furnace means in communication with the conditioner means and main dryer means for maintaining the temperature in the conditioner means and main dryer means at a value above the condensation point of the moisture in the material and controlling the heat supplied as a function of the desired final moisture content of the material, and the furnace means including a conditioner furnace connected to the conditioner means, and a main furnace means connected to the conditioner means and main dryer means for receiving a gaseous current passed from the conditioner means and superheating the current for supplying a superheated gaseous current to the main dryer means.

4. Apparatus as defined in claim 3, wherein said conditioner means has a single pass dryer, and said main dryer means has a multipass dryer in communication with said single pass dryer.

5. Apparatus as defined in claim 4, wherein said conditioner means has adjustable deflector means arranged in said single pass dryer for deflecting the material to different locations in said single pass dryer for maintaining a predetermined temperature therein.

6. Apparatus as defined in claim 4, wherein said main dryer means has a cyclone separator in communication with said multipass dryer for separating the gaseous current from the dried material.

* * * * *